United States Patent Office 3,035,023
Patented May 15, 1962

3,035,023
METHOD OF SEPARATING XYLENE ISOMERS
Minoru Imoto and Ching Yun Huang, Osaka, Japan, assignors to Fine Organics, Inc., New York, N.Y., a corporation of New York
No Drawing. Filed Oct. 23, 1958, Ser. No. 769,076
6 Claims. (Cl. 260—67)

This invention relates to, and has for its principal objects, the separation of the isomeric xylenes from mixtures thereof.

Xylene obtained in coal distillation industry and petrochemical industry is the mixture of ortho-, meta- and para-isomers, the boiling points of which are extremely close to each other.

The difference between the boiling points of meta-xylene and para-xylene is especially so small that the separation from one another by distillation is quite difficult.

Even through other physical means, for instance, through separation by crystallization, meta-xylene and para-xylene produce an eutectic mixture, so that complete isolation of them is comparatively difficult or gives rise to some inconveniences, such as the need to use very large and expensive equipment.

On the other hand, there are some methods of separation based on the chemically reactive properties of xylene isomers, for instance, optional sulfonation of meta-xylene and mercury acetate process which result in the formation of meta-xylene compounds.

But the meta-xylene compounds, once separated through the abovementioned processes, have very little economic value, if any, as so obtained. Therefore, troublesome operations to reduce them into meta-xylene by redecomposition and subsidiary materials for separation are necessary.

This invention has succeeded in providing for the separation of xylene isomers with great effect and ease, taking advantage of the fact that there exist conspicuous differences between the reactivities of these isomers, when ortho-, meta- and para-xylene react with formaldehyde or paraformaldehyde, in the presence of a mineral acid, such as hydrochloric acid, sulfuric acid or perchloric acid, to produce xylene formaldehyde resin.

Accordingly, this invention deals with the method of separation of xylene isomers, characteristic of which are the following:

When a mixture of xylene isomers is reacted with formaldehyde or polymeric forms thereof, as for example, paraformaldehyde, meta-xylene alone is converted to a meta-xylene formaldehyde resin, which can be readily separated from the other isomers and which resin can be used as a moulding material like phenol formaldehyde resin.

At the same time, there is obtained a mixture of unreacted ortho-xylene and para-xylene, both of which have different boiling points and can be separated from one another by distillation.

This mixture of o- and p-xylene is then separated into two parts through distilling.

By the process of this invention, meta-xylene can be readily reacted with formaldehyde, 10 or more times faster than with ortho- or para-xylene and a resin is produced. Therefore, the operation is extremely simple; and furthermore the formed resin can then be cured to be used as moulding material.

This method does not need any re-decomposition (as in the case of sulfonation process) and if one adjusts the conditions of the reaction properly, one can minimize the resinification of ortho- and para-xylene and can accomplish the complete resinification of meta-xylene.

Therefore, the remaining mixture of ortho-xylene and para-xylene can be readily and efficiently distilled to produce ortho- and para-xylene of high purity. The rate of preferential resinification of xylene when reacted with formaldehyde depends on the temperature and time of the reaction, pH of the reactants and the ratio of the xylene mixture to formaldehyde or paraformaldehyde.

For instance, at relatively low temperature, 40°–60° C., ortho- and para-xylene do not react at all, and a part of meta-xylene also is left unreacted. But if an acid is present to a great extent, not only meta-xylene but a part of para-xylene reacts and produces resins.

The larger the mol. ratio of formaldehyde or paraformaldehyde, the smaller is the resinification rate of meta-xylene.

It has been discovered that the best conditions for the preferential or optional resinification of only the meta-xylene contained in the mixture of xylene isomers are as follows:

Mineral acid: 0.2–0.4 mol. (based on 1 mol. of xylene mixture)
Formaldehyde (or paraformaldehyde): 1–2 mol. (based on HCHO)
Reaction temperature: 80–100° C.
Reaction period: 5–24 hours Examples according to the invention are as follows:

*Example I*

A three-necked flask, 5 litres in capacity, equipped with a thermometer, a reflux condenser and a stirrer, is charged with the following mixture. 1060 g. (grams) (10 mol.) of mixed xylenes, consisting of 19 percent ortho-, 57 percent meta-, 25 percent para- and 3 percent ethylbenzene distilled from coal-tar, 810 g. of 37 percent formaldehyde, and 300 cc. of concentrated sulfuric acid (acid content 98 to 100 percent).

Then the unreacted portion of the xylene mixture is distilled by steam.

The unreacted xylene distillate is then dehydrated with calcium chloride and fractionally distilled. 138 g. of para-xylene and 80 g. of ortho-xylene and 71 g. of ethyl benzene are obtained.

The xylene mixture distillate is found to contain practically no meta-xylene (through infra-red spectral analysis).

The residue remaining after the steam distillation is dissolved in benzene, and then the benzene containing traces of water is distilled away under reduced pressure. There remains a resin, 802 g., slightly yellowish in color, of semi-liquid form, molecular weight approximately 450.

*Example II*

By the same method as is described in Example I, there are recovered 233 g. of ortho-xylene, 380 g. of paraxylene and 500 g. of meta-xylene formaldehyde resin by reacting the following mixture for 10 hours at the temperature of 100° C.

Xylene mixture _____ g__ 1060
Sulfuric acid, 100 percent _____ cc__ 198
Formaldehyde, 37 percent_____ g__ 585

The unreacted xylene is found to contain para- 43.5 percent, meta- 4 percent, ortho-xylene, 28.5 percent and ethylbenzene 19 percent (through infra-red spectral analysis).

*Example III*

Using the same method and apparatus as is described in Example I, 1060 g. of a xylene mixture (10 mol.), 300 g. of para-formaldehyde and 600 cc. of water are heated at 100° C. Then 200 g. of 60 percent perchloric acid (2 mol.) are dropped into the mixture within 1.5 hours while stirring.

By reacting the mixture for a further 8.5 hours after the addition of the acid is completed, at the temperature of 100° C., there are obtained 210 g. of ortho-xylene, 195 g. of para-xylene, 56 g. of ethylbenzene and 680 g. of meta-xylene formaldehyde resin.

The distilled xylene is found to contain no meta-xylene (through infra-red spectral analysis).

The time required to convert all of the meta-xylene in a mixture of the isomeric xylenes into the meta-xylene-formaldehyde resin can readily be determined by taking samples of the reaction mixture from time to time and measuring the unconverted meta-xylene content thereof.

The proportions of the reactants can be varied from those set forth in the examples, which are preferred.

It will be understood that the foregoing description of the invention and the samples set forth by us are illustrative of the principles thereof. Accordingly the appended claims are to be considered as defining the invention within the full spirit and scope thereof.

We claim:
1. The method which comprises: heating at a temperature of approximately 80°–100° C. a mixture of (a) 1 mol of isomeric xylenes containing meta-xylene with (b) about 1.0 to 2.0 mols of a member of the group consisting of formaldehyde and paraformaldehyde, and (c) about 0.2 to 0.4 mol of a strong acid, thereby to convert the meta-xylene into a meta-xylene-formaldehyde resinous condensation product, and removing the unreacted isomeric xylenes substantially free of meta-xylene from the reaction mixture.

2. The method which comprises: heating at a temperature of approximately 80°–100° C. for about 5–24 hours under reflux a mixture of (a) 1 mol of isomeric xylenes containing meta-xylene with (b) about 1.0 to 2.0 mols of a member of the group consisting of formaldehyde and paraformaldehyde, and (c) about 0.2 to 0.4 mol of a strong acid, thereby to convert the meta-xylene into a meta-xylene-formaldehyde resinous condensation product, and removing the unreacted isomeric xylenes substantially free of meta-xylene from the reaction mixture.

3. The method which comprises: heating at a temperature of approximately 80°–100° C. for about 5–24 hours under reflux a mixture of (a) 1 mol of isomeric xylenes containing meta-xylene with (b) about 1.0 to 2.0 mols of formaldehyde, and (c) about 0.2 to 0.4 mol of a strong acid, thereby to convert the meta-xylene into a meta-xylene-formaldehyde resinous condensation product, and removing the unreacted isomeric xylenes substantially free of meta-xylene from the reaction mixture.

4. The method which comprises: heating at a temperature of approximately 80°–100° C. for about 5–24 hours under reflux a mixture of (a) 1 mol of isomeric xylenes containing meta-xylene with (b) about 1.0 to 2.0 mols of paraformaldehyde, and (c) about 0.2 to 0.4 mol of a strong acid, thereby to convert the meta-xylene into a meta-xylene-formaldehyde resinous condensation product, and removing the unreacted isomeric xylenes substantially free of meta-xylene from the reaction mixture.

5. The method which comprises: heating at a temperature of approximately 80°–100° C. for about 5–24 hours under reflux a mixture of (a) 1 mol of isomeric xylenes containing meta-xylene with (b) about 1.0 to 2.0 mols of formaldehyde, and (c) about 0.2 to 0.4 mol of sulfuric acid, thereby to convert the meta-xylene into a meta-xylene-formaldehyde resinous condensation product, and removing the unreacted isomeric xylenes substantially free of meta-xylene from the reaction mixture.

6. The method which comprises: heating at a temperature of approximately 80°–100° C. for about 5–24 hours under reflux a mixture of (a) 1 mol of isomeric xylenes containing meta-xylene with (b) about 1.0 to 2.0 mols of paraformaldehyde, and (c) about 0.2 to 0.4 mol of perchloric acid, thereby to convert the meta-xylene into a meta-xylene-formaldehyde resinous condensation product, and removing the unreacted isomeric xylenes substantially free of meta-xylene from the reaction mixture.

References Cited in the file of this patent
UNITED STATES PATENTS
2,825,712    Witzel _____ Mar. 4, 1958